United States Patent [19]

Hibino et al.

[11] Patent Number: 4,498,307
[45] Date of Patent: Feb. 12, 1985

[54] ABSORPTION COLD AND WARM WATER SYSTEM UTILIZING SOLAR HEAT

[75] Inventors: Yozo Hibino; Kohji Kamejima, both of Ibaraki; Yasuaki Nara, Tsuchiura, all of Japan

[73] Assignee: Hitachi, Ltd., Tokyo, Japan

[21] Appl. No.: 493,704

[22] Filed: May 11, 1983

[30] Foreign Application Priority Data

May 12, 1982 [JP] Japan .................................. 57/78288

[51] Int. Cl.³ .............................................. F25B 15/00
[52] U.S. Cl. ......................................... 62/148; 62/236; 62/238.3; 62/235.1; 62/476
[58] Field of Search .................... 62/148, 476, 238.3, 62/236, 235.1

[56] References Cited

U.S. PATENT DOCUMENTS

| | | | |
|---|---|---|---|
| 3,575,008 | 4/1971 | Lorenz | 62/148 X |
| 3,837,174 | 9/1974 | Miyagi et al. | 62/148 X |
| 4,028,078 | 6/1977 | Peckham | 62/476 X |
| 4,070,870 | 1/1978 | Bahel et al. | 62/238.3 X |
| 4,251,997 | 2/1981 | Newton | 62/148 X |
| 4,280,331 | 7/1981 | Yoshii et al. | 62/235.1 X |

Primary Examiner—Lloyd L. King
Attorney, Agent, or Firm—Antonelli, Terry & Wands

[57] ABSTRACT

An absorption cold and warm water system utilizing solar heat in which heat source water obtained by heating water by the solar heat and a main heating source are used is selectively made to function as a warm water system, a first heat pump and a second heat pump in accordance with temperature conditions associated with the heat source water.

10 Claims, 2 Drawing Figures

ABSORPTION COLD AND WARM WATER SYSTEM UTILIZING SOLAR HEAT

BACKGROUND OF THE INVENTION

1. Field of the Invention

This invention relates to absorption cold and warm water systems utilizing solar heat, and more particularly, to an absorption cold and warm water system suitable for providing warm water.

2. Description of the Prior Art

Absorption cold and warm water systems have been in use as heat pumps wherein warm water of low temperature has its temperature raised to a high level, depending on the form of the heat utilized. Various forms of heat have been available, and a system utilizing heat of low temperature, released as exhausts from plants and buildings, is described in NIKKEI MECHANICAL, Feb. 1, 1982.

Meanwhile, in recent years attention has been directed to absorption cold and warm water systems utilizing solar heat in an effort to make effective use of available energy. In one type of absorption cold and warm water system utilizing solar heat, the system functions first as a heat pump to provide warm water in which, when heat source water obtained by solar heating of water reaches an intermediate temperature level, the heat source water is fed to an evaporator of the absorption cold and warm water system and the heat of the heat source water is utilized through heating by a main heat source, such as a burner. A disadvantage of this system, resides in the fact that, when the heat source water has a high temperature, difficulties are experienced in efficiently transferring heat from the high temperature heat source water to warm water through heat exchange, thereby causing a loss of energy to occur.

Meanwhile, when the heat source water has a high temperature, absorption cold and warm water systems operate in different modes. More particularly, in one mode, the system functions as a warm water system in which warm water is produced through heating by the heat source water fed to an ancillary heat source generator of the absorption cold and warm water system or by a main heat source. In another mode, the system functions as a second heat pump by feeding the high temperature heat source water to the evaporator to utilize the heat possessed by the heat source water. Disadvantages of these modes reside in the fact that efficiency of the system is reduced when the temperature of the heat source water drops, and a loss of energy occurs because the system are unable to make effective use of heat source water of a temperature below an intermediate level. In these modes, heat exchange is directly effected between the high temperature heat source water and warm water, making it necessary to use an additional heat exchanger.

SUMMARY OF THE INVENTION

An object of this invention is to provide an absorption cold and warm water system utilizing solar heat capable of maximizing energy efficiency.

Another object is to provide an absorption cold and warm water system capable of efficiently producing warm water by effectively utilizing the solar heat.

To accomplish the aforesaid objects, the invention provides an absorption cold and warm water system utilizing solar heat in which heat source water obtained by heating water by the solar heat and a main heating source are used.

In accordance with advantageous features of the present invention, a switching means is mounted in a supply system for feeding the heat source water to the cold and warm water system for switching the supply system in such a manner that the cold and warm water system selectively functions as a warm water system relying on heating by the main heating source without receiving a supply of heat source water. A first heat pump, in which the heat source water is fed to an evaporator of the cold and warm water system and the heat possessed by the heat source water, is utilized through heating by the main heating source, and a second heat pump in which the heat source water is fed to the evaporator and a solar heat source generator of the cold and warm water system and the heat possessed by the heat source water released at the evaporator is utilized through the solar heat source generator and the main heating source. Control means are provided for controlling the switching means and the main heating source in accordance with temperatures associated with the heat source water.

Additional and other objects, features and advantages of the invention will become more apparent from the description set forth hereinafter when considered in conjunction with the accompanying drawing.

DESCRIPTION OF THE PREFERRED EMBODIMENT

Figure 1:
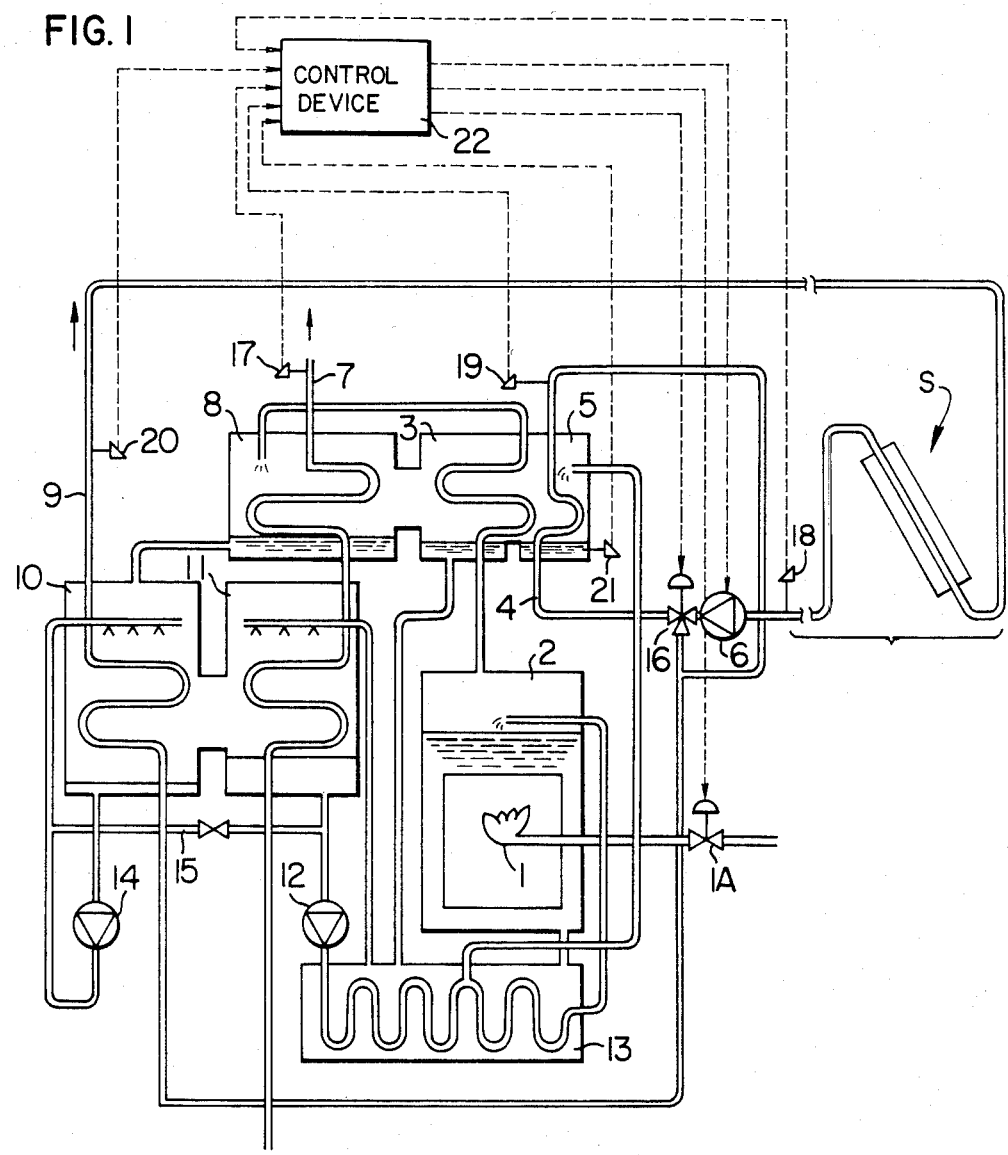
FIG. 1 is a systematic view of the absorption cold and warm water system utilizing solar heat according to an embodiment of the invention.
Figure 2:
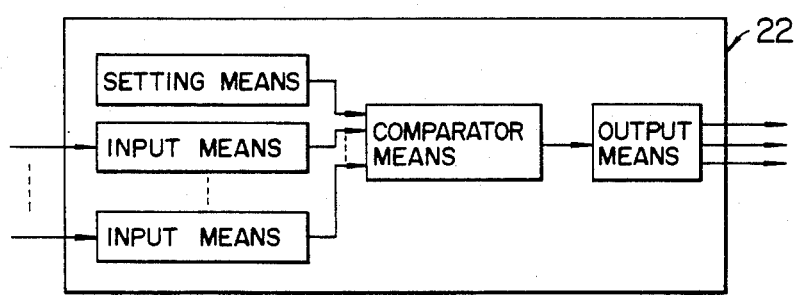
FIG. 2 is a circuit diagram of a practical embodiment of a control device in accordance with an embodiment of the invention.

One embodiment of the invention will now be described by referring to the accompanying drawing showing an absorption cold and warm water system utilizing solar heat according to the invention. More particularly, as shown in FIG. 1, the absorption cold and warm water system comprises a high temperature generator 2 for generating refrigerant vapor (water vapor) by heating a dilute solution by a main heating source 1, a low temperature generator 3 for generating water vapor by heating a dilute solution by the water vapor generated at the high temperature generator 2, a solar heat source generator 5 for producing a dilute solution by heat source water heated by a solar heating means S and supplied through a heat source water pipe 4 for the generators heated by the solar heat. A circulation pump 6 is provided for feeding the heat source water to the cold and warm water system, with a condenser 8 being provided for cooling and condensing the water vapor generated at the generators 2, 3 and 5 by warm water flowing through a warm water pipe 7 while giving heat of condensation to the warm water. An evaporator 10 vaporizes the condensate or refrigerant (water) in a liquid state obtained at the condenser 8 while depriving heat source water flowing through a heat source water pipe 9 for the evaporator of heat of vaporization, with an absorber 11 producing a dilute solution by causing a concentrated solution led from the generators 2, 3, 5 to absorb the water vapor provided by vaporization at the evaporator 10 while giving heat of absorption to the warm water. A solution pump 12 feeds the dilute solution produced at the absorber 11 to the generators 2, 3, 5, with a heat exchanger 13 allowing heat exchange to take place between a dilute solution fed from the absorber 11 to the generators 2, 3, 5 and a concentrated solution returned from the generators 2, 3, 5 to the absorber 11. A refrigerant pump 14 causes a refrigerant in the evaporator 10 to circulate, and a by-pass pipe 15 feeds a refrigerant to the absorber 11. A three-way valve 16 is provided for switching the heat source water obtained by heating water by the solar heat between a system through which the heat source water is fed through the heat source water pipe 4 for the generators to the heat source water pipe 9 for the evaporator 10, and a system through which the heat source water is fed directly to the heat source water pipe 9 for the evaporator. A sensor 17 senses an output temperature of warm water in the warm water pipe 7, a sensor 18 senses an inlet temperature of heat source water in the water pipe 4, a sensor 19 senses an outlet temperature of heat source water from the solar heat source generator 5, a sensor 20 senses an outlet temperature of heat source water in the heat source pipe 9 from the evaporator 10, and a sensor 21 senses a temperature of a solution in the solar heat source generator 5. A control device generally designated by the reference numeral 22 controls a fuel supply valve 1A of the main heat source 1, the circulation pump 6 and the three-way valve 16 based on signals from the sensors 17, 18, 19, 20 and 21. The control device 22 comprises a setting means for setting values from outside, an input means for inputting current values of temperatures in predetermined positions, a comparator means for comparing the current values with the set values and an output means for providing predetermined control signals subsequently to be described based on the results of comparison. The control device 22 may be in the form of an electromagnetic relay circuit or an electronic circuit.

If the heat source water is fed to the evaporator 10 or the generator 5 when the heat source water generally has a low temperature, the heat source water would be heated and a loss of energy would ensue. Thus, when the heat source water is low in temperature, the system functions as a warm water system in which heat of condensation of water vapor and heat of absorption of a concentrated solution are generated through heating by the main heat source 1. In this case, the circulation pump 6 is rendered inoperative or the flow rate of the heat source water is reduced by a command from the control device 22.

When the temperature of the heat source water is at an intermediate level, the system functions as a first heat pump in which the valve 16 is actuated by the control device 22 to feed the heat source water through the valve 16 only to the evaporator 10 to accelerate generation of water vapor at the evaporator 10, and heat of vaporization generated at the evaporator 10 is utilized through heating by the main heat source 1 while causing heat of condensation and heat of absorption to be generated.

When the heat source water has a high temperature, the system functions as a second heat pump in which the heat source water is fed to the evaporator 10 as is the case with the first heat pump to accelerate a generation of water vapor at the evaporator 10 and heat of vaporization generated at the evaporator 10 is utilized through the heat source water fed to the solar heat source generator 5 or through heating by the main heat source 1 while causing heat of condensation and heat of absorption to be generated. In this case, heat source water is fed to both the evaporator 10 and the solar heat source generator 5 through the valve 16.

The absorption cold and warm water system can be switched between the above-explained three modes of operation by means of the valve 16 and pumps 6 and 14 actuated by commands from the control device 22, and the switching may be effected noncontinuously, step by step or continuously.

Basically switching of the absorption cold and warm water system between the three modes of operation as a warm water system, a first heat pump and a second heat pump is effected based on the performance index of whether maximization of energy efficiency or effective use of the solar heat can be achieved by the selected mode of operation, regardless of whether switching is effected noncontinuously, step by step or continuously. Based on this concept, the invention improves energy efficiency and makes effective use of the solar heat by performing the following control functions:

First, operation for continuously switching the absorption cold and warm water system between the three modes of operation will be described.

One control function consists in switching the system between the three modes of operation in accordance with an inlet temperature of the heat source water. Table 1 shows the relationship between the inlet temperature T of the heat source water and the three modes of operation.

TABLE 1

| T | Modes of Operation |
| --- | --- |
| Below $T_1$ | Warm Water system |
| $T_1$ to $T_2$ | First Heat Pump |
| Over $T_2$ | Second Heat Pump |

Temperature conditions for switching the system between the three modes of operation are decided as shown in Table 1 because it is possible to determine by the inlet temperature T of the heat source water whether or not the selected mode of operation functions at a high efficiency level. The inlet temperature T of the heat source water is sensed by the sensor 18. These conditions are preferably corrected by an output of the cold and warm water system or an outlet temperature of warm water indicating such output. When the output is great or the outlet temperature of the warm water is high, for example, the temperature conditions are altered to slightly raise the temperature.

Another control function consists in using the difference $\Delta T_A$ between the inlet temperature T of the heat source water and an outlet temperature $T_A$ as a basis for switching the system between the three modes of operation. The temperature difference $\Delta T_A$ clearly indicates conditions of the three modes of operation, so that the temperature conditions shown in Table 2 are used as a basis for switching the system between the three modes of operation.

TABLE 2

| $\Delta T_A (= T - T_A)$ | Modes of Operation |
| --- | --- |
| Below $\Delta T_{A1}$ | Warm Water System |
| $\Delta T_{A1}$ to $\Delta T_{A2}$ | First Heat Pump |
| Over $\Delta T_{A2}$ | Second Heat Pump |

These conditions are preferably corrected by the output of the cold and warm water system or the outlet temperature of warm water indicating such output. For example, when the output is large or the output temperature of the warm water is high, the temperature difference $\Delta T_A$ is slightly raised.

Still another control function consists in switching the system between the first heat pump and the second heat pump based on the temperature difference $\Delta T_B$ between the inlet temperature T of the heat source water and the solution temperature $T_B$ in the solar heat source generator 5. The temperature difference $\Delta T_B$ indicates whether or not the heat source water can serve as a heating source of the solar heat source generator, so that the temperature conditions shown in Table 3 are used as a basis for switching the system between the two modes of operation.

TABLE 3

| $\Delta T_B (= T - T_B)$ | Modes of Operation |
| --- | --- |
| Below $\Delta T_{B1}$ | First Heat Pump |
| Over $\Delta T_{B2}$ | Second Heat Pump |

A further control function consists in switching the system between the first heat pump and the second heat pump based on the temperature difference $\Delta T_C$ between the inlet temperature T of the heat source water to the solar heat source generator 5 and its outlet temperature $T_C$. The temperature difference $\Delta T_C$ clearly indicates conditions of the two modes of operation, so that the temperature conditions shown in Table 4 are used as a basis for switching the system between the first heat pump and the second heat pump.

TABLE 4

| $\Delta T_C (= T - T_C)$ | Modes of Operation |
| --- | --- |
| Below $T_{C1}$ | First Heat Pump |
| Over $T_{C2}$ | Second Heat Pump |

When it is desired to switch the system between different modes of operation in a step by step manner or from one stage to another, it is only necessary to make each of Tables 1–4 to conform to each stage of the different modes of operation. The control device 22 switches the pumps 6 and the valve 16 from one stage to another in accordance with Tables 1–4, to thereby switch the system between the different modes of operation from one stage to another.

When it is desired to continuously switch the system between the three modes of operation, it is only receiving to express each of Tables 1–4 in the form of a series of continuous functions with regard to the respective temperature conditions, to make the functions continuously correspond to the modes of operation. The control device 22 switches the pumps 6 and the valve 16 continuously in accordance with The Tables 1–4, to thereby switch the systems between the different modes of operation continuously.

In the embodiment described hereinabove, the temperature conditions (Tables 1–4) for switching the system between the different modes of operation have been described individually. It is to be understood, however, that these conditions may be used in a suitable combination.

From the foregoing description, it will be appreciated that the absorption cold and warm water system utilizing solar heat according to the invention can be switched noncontinuously, step by step or continuously between different modes of operation or a warm water system, a first heat pump and a second heat pump in accordance with various temperature conditions based on the temperature levels of the heat source water and the output levels of the cold and warm water system. This makes it possible to maximize energy efficiency and make effective use of solar heat at all times. Additionally, the absorption cold and warm water system according to the invention is simple in construction and the control device is also simple in construction.

What is claimed is:

1. An absorption cold and warm water system comprising an evaporator means, solar heat generator means for heating water by solar heat so as to provide heat source water, a main heating source means a supply means for feeding the heat source water to the cold and warm water system, switching means for switching the supply means in such a manner that the cold and warm water system selectively functions as a warm water system relying on heating by the main heating source means without receiving a supply of heat source water, said switching means being adapted to be displaced to a first position wherein the heat source water is fed to the evaporator means of the cold and warm water system whereby the heat of the heat source water is utilized through heating by the main heating source means, and a second position wherein the heat source water is fed to the evaporator means and the solar heat generator means and the heat possessed by the heat source water released at the evaporator means is utilized through the solar heat generator means and the main heating source; and control means for controlling said switching means and said main heating source means in accordance with a temperature of the heat source water.

2. An absorption cold and warm water system as claimed in claim 1, further comprising a supply pipe means for supplying the heat source water heated by said solar heat generator means, a heat source water pipe means for the evaporator means, a heat source pipe means for the solar heat generator means, said switching means includes a directional control valve means for switching the supply pipe means for the heat source water of the solar heat generator means to the heat source water pipe means for the evaporator means through the heat source water pipe means for the generator means, and means for connecting said supply pipe directly to said heat source water pipe means for the evaporator means.

3. An absorption cold and warm water system as claimed in claim 2, wherein said control means is adapted to control said directional control valve means and said main heating source means in accordance with an inlet temperature of the heat source water in such a manner that the cold and warm water system selectively functions as the warm water system, a first heat pump and a second heat pump.

4. An absorption cold and warm water system as claimed in claim 3, wherein said control means is adapted to control the directional control valve means and the main heating source means in such a manner that the cold and warm water system functions as the warm water system when the inlet temperature of the heat source water is below a first predetermined value, functions as the first heat pump when the inlet temperature of the heat source water is intermediate between the first predetermined value and a second predetermined value, and functions as the second heat pump when the inlet temperature of the heat source water is above the second predetermined value.

5. An absorption cold and warm water system as claimed in claim 2, wherein said control means is adapted to control the directional control valve means and the main heating source means in such a manner that the cold and warm water system selectively functions as the warm water system, a first heat pump and a second heat pump in accordance with the difference between an inlet temperature and an outlet temperature of the heat source water.

6. An absorption cold and warm water system as claimed in claim 5, wherein said control means is adapted to control the directional control valve means and the main heating source means in such a manner that the cold and warm water system functions as the warm water system when the temperature difference is below a first predetermined value, functions as the first heat pump when the temperature difference is intermediate between the first predetermined value and a second predetermined value, and functions as the second heat pump when the temperature difference is over the second predetermined value.

7. An absorption cold and warm water system as claimed in claim 2, wherein said control means is adapted to control the directional control valve means and the main heating source means in such a manner that the cold and warm water system functions as a first heat pump and a second heat pump in accordance with the difference between an inlet temperature of the heat source water and a temperature of a solution in the solar heat generator means.

8. An absorption cold and warm water system as claimed in claim 7, wherein said control means is adapted to control the directional control valve means and the main heating source means in such a manner that the cold and warm water system functions as the first heat pump when said temperature difference is below a first predetermined value, and functions as the second heat pump when the temperature difference is above as second predetermined value.

9. An absorption cold and warm water system as claimed in claim 2, wherein said control means is adapted to control the directional control valve means and the main heating source means in such a manner that the cold and warm water system functions as a first heat pump and a second heat pump in accordance with the difference between an inlet temperature and an outlet temperature of the heat source water at the solar heat generator means.

10. An absorption cold and warm water system as claimed in claim 9, wherein said control means is adapted to control the directional control valve means and the main heating source means in such a manner that the cold and warm water system functions as the first heat pump when said temperature difference is below a first predetermined value, and functions as the second heat pump when the temperature difference is above a second predetermined value.

* * * * *